UNITED STATES PATENT OFFICE.

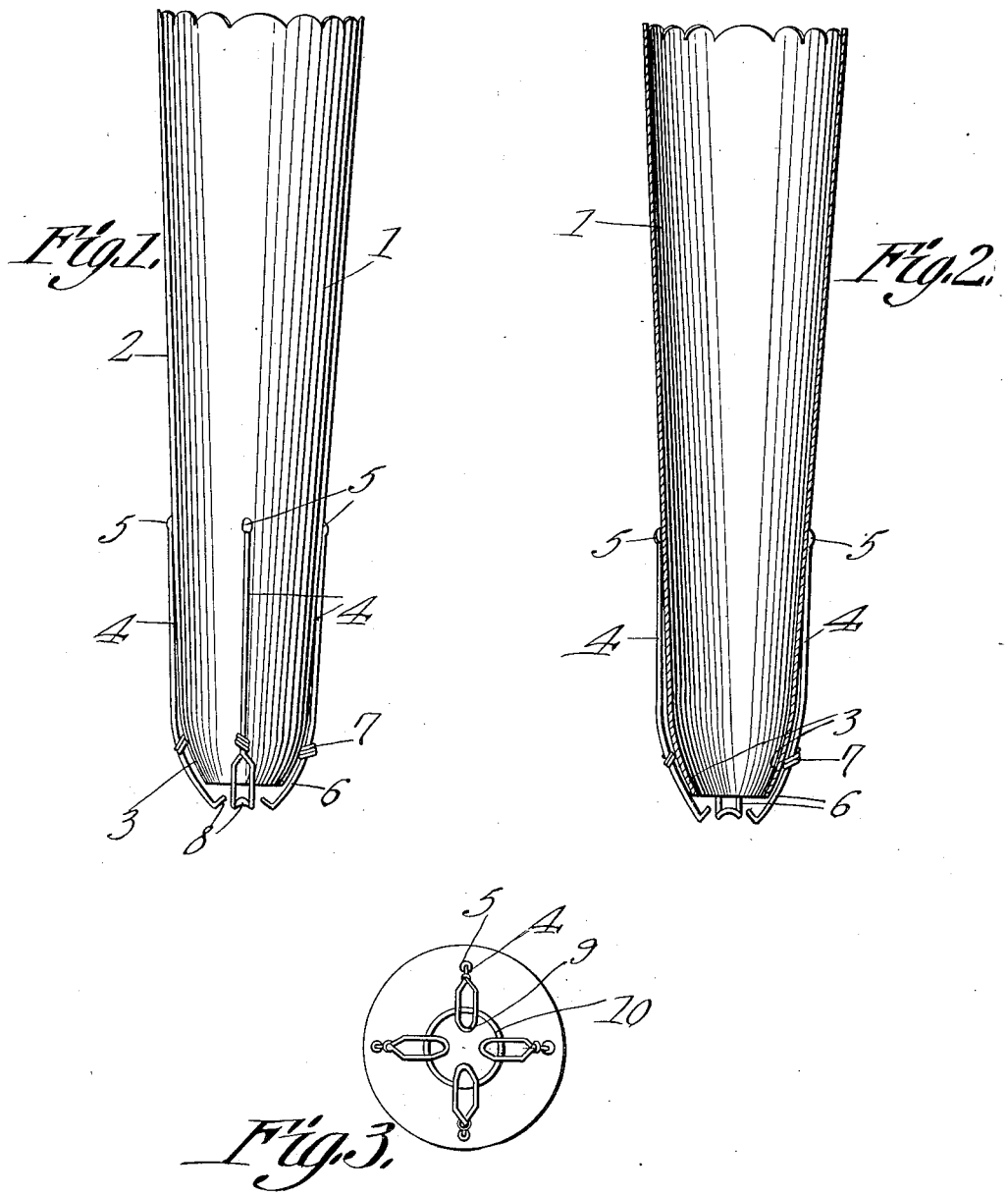

JAMES Y. FIELD, OF MOUND CITY, MISSOURI.

GRAIN-SEGREGATOR.

1,094,646.  Specification of Letters Patent.  Patented Apr. 28, 1914.

Application filed June 23, 1913. Serial No. 775,447.

*To all whom it may concern:*

Be it known that I, JAMES Y. FIELD, a citizen of the United States, residing at Mound City, in the county of Holt and State of Missouri, have invented a new and useful Grain-Segregator, of which the following is a specification.

The device forming the subject matter of this application is a grain segregator, adapted to be held in the hand of the operator and to be placed upon kernels of grain for the purpose of picking up imperfect kernels, to separate the same from perfect kernels.

One object of the invention is to provide a grain segregator of the type above described which will pick up the kernels readily and retain the same.

Another object of the invention is to provide a grain segregator of the sort above mentioned which may be emptied readily.

It is within the scope of the invention to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawing:—Figure 1 shows the invention in side elevation; Fig. 2 is a longitudinal section; Fig. 3 is an end elevation.

In carrying out the invention there is provided a receptacle or body 1, preferably in the form of a metal tube, the receptacle 1 tapering gradually as indicated at 2, from its upper end to a point adjacent its lower end. The extreme lower end of the receptacle 1 is tapered somewhat abruptly as indicated at 3. A plurality of resilient arms 4 are provided, the same preferably consisting of lengths of wire, the upper ends of arms 4 being secured by drops of solder 5, or otherwise, to the outer face of the receptacle 1. The lower ends of the arms 4 are bent upon themselves to form loop-shaped heads 6, the extremities of the arms 4 being twisted about the body portion of the arms as shown at 7, to close and complete the heads 6. The lower ends of the arms 4 and the heads 6 conform approximately to the taper of the receptacle 1 as indicated at 3. The lower ends of the loop shaped heads 6 are bent inwardly as indicated at 8 to form fingers, the fingers being bluntly pointed as indicated at 9. The lower ends of the heads and the fingers 8 lie within the extended contour of the opening 10 existing in the lower end of the receptacle 2. The fingers 8 slant toward the open end 10 of the receptacle 1 and define an acute angle with the axis of the receptacle.

In practical operation, a quantity of beans, corn, rice or any other grain are spread out upon a table, and the imperfect kernels are noted by the operator. The receptacle 1 is then placed above an imperfect kernel and is depressed thereover, the kernel being received between the inclined fingers 8. The arms 4 will then yield and the kernel will pass upwardly above the fingers 8, the fingers snapping toward each other beneath the kernel. In this manner, one kernel after another may be accumulated in the receptacle 1, and at any desired point in the operation, the receptacle 1 may be inverted, the accumulated kernels being poured out of the upper end of the receptacle. Owing to the fact that the receptacle 1 slants or tapers as indicated at 2, there will be no jamming or wedging of the kernels within the receptacle, and the receptacle may be emptied readily. Owing to the fact that the heads 6 are of looped shape, the kernel is prevented from passing between the heads 6 after the kernel is above the fingers 8. Owing to the fact that the fingers 8 slant toward the open end 10 of the receptacle 1 and define an acute angle with the axis of the receptacle, the kernels of grain may be centered readily and all of the arms 4 will yield simultaneously, thereby preventing the kernel of grain from being snapped horizontally when the receptacle 1 is depressed upon the kernel. Since the fingers 8 are pointed as indicated at 9, the movement of the kernel of grain from the fingers 8 within the contour of the receptacle 1 is facilitated. The looped shape of the fingers 8, as clearly shown in Fig. 3, aids in holding the kernel of grain centered.

The twisted portions 7 constitute shoulders which, engaging the outer wall of the receptacle or body 1, serve to space the heads 6 from the side wall of the body or receptacle, thereby preventing loosened parts of the kernel from being bound between the head and the side wall of the body. Especial attention is directed to the fact that the heads 6 are of loop-shape and in this connection, Fig. 3 is to be noted. Owing to the fact that the heads are of loop form there are twice as many radially extended centering elements as there are arms. In other words, there are in the present disclosure, but four arms, but, noting Fig. 3, it will be observed that there are eight centering parts which are prolonged within the extended contour of the opening at the lower end of the body. Owing to the fact that the heads are of loop-shape, the kernel will not slip laterally, even if the kernel happens to be engaged between a single pair of oppositely disposed loop shaped parts.

Having thus described the invention, what is claimed is:—

1. A grain segregator comprising a receptacle, having an opening at one end; and resilient arms secured to the receptacle, the arms terminating in angular loop-shaped fingers protruding within the extended contour of the opening.

2. A grain segregator comprising a tubular body; and a plurality of arms each secured at one end to the body, each arm comprising a shank bent upon itself to form a loop-shaped head prolonged angularly within the extended contour of the body to form a U-shaped finger, the sides of the finger coöperating, throughout the several fingers, to prevent a kernel from slipping laterally under the pressure of the fingers, the looped form of the heads serving to reinforce the heads and to prevent a bending of the heads when the fingers are pressed upon a kernel, and the shanks being yieldable to offset the stiffening resulting from the looped form of the heads, and to permit the fingers to open and to close with respect to a segregated kernel, the other end of each arm being twisted around the shank to close the head and to form a shoulder which engages the body to space the head from the side wall of the body, thereby preventing loosened parts of the kernel from being bound between the head and the side wall of the body.

3. A grain segregator comprising a receptacle having an opening at one end; and resilient arms secured to the receptacle, the arms terminating in angular fingers protruding within the extended contour of the opening, each arm having a shoulder intermediate its ends, the shoulder engaging the receptacle to space the lower end of the arm from the side wall of the receptacle, thereby preventing loosened parts of the kernel from being bound between the lower end of the arm and the wall of the receptacle.

In testimony that I claim the foregoing as my own, I have hereto affixed my signature in the presence of two witnesses.

JAMES Y. FIELD.

Witnesses:
 A. M. TIBBETS,
 ROBERT E. TERHUNE.